United States Patent [19]

Gowan

[11] 4,185,273
[45] Jan. 22, 1980

[54] DATA RATE ADAPTIVE CONTROL DEVICE FOR MANCHESTER CODE DECODERS

[75] Inventor: Richard L. Gowan, Bonita, Calif.

[73] Assignee: The United States of America as represented by the Secretary of the Navy, Washington, D.C.

[21] Appl. No.: 819,638

[22] Filed: Jul. 27, 1977

[51] Int. Cl.² .................... H03K 13/24; G11B 5/09
[52] U.S. Cl. .................. 340/347 DD; 360/43; 360/51
[58] Field of Search .............. 360/42, 43, 32; 340/347 DD; 235/449, 462, 463, 92 V; 328/56, 61, 51, 155; 333/29

[56] References Cited

U.S. PATENT DOCUMENTS

| 3,204,228 | 8/1965 | Eckert | 360/26 X |
| 3,624,519 | 11/1971 | Beydler | 328/56 X |
| 3,987,278 | 10/1976 | Van Elzakker et al. | 235/92 V X |

OTHER PUBLICATIONS

The Engineering Staff of Analog Devices, Inc., Analog–Digital Conversion Handbook, 6/1972, pp. I-64 and I-65.

Primary Examiner—Thomas J. Sloyan
Attorney, Agent, or Firm—R. S. Sciascia; G. J. Rubens; T. M. Phillips

[57] ABSTRACT

An automatic means for decoding a wide data range of Manchester code data. Variable delay means are provided for the Manchester code decoder which are digitally controlled in response to the output of a data rate sensing circuit that provides a digital equivalent of the sensed data rate. The digital equivalent of the sensed data rate is used to optimize the amount of delay in the Manchester code decoder for the particular data rate of the data being received.

4 Claims, 7 Drawing Figures

| MANCHESTER CODE INPUT DATA RATE AND VALUES OF $D_1$ AND $D_2$ REQUIRED | PULSE WIDTH W OF PREAMBLE BITS (±5%) | NUMBER OF DIGITIZING COUNTS STORED IN DELAY CONTROL REGISTER FROM 100MHz DIGITIZING OSCILLATOR | RANGE OF DIGITAL VALUES FOR W ±5% $M_{S_B}$ $L_{S_B}$ | READ ONLY MEMORY OUTPUT C B A |
|---|---|---|---|---|
| $D_1=D_2=300$ns  1.0 MHz | 500ns (525-475) | 52  47 | 0 0 1 1 0 1 0 0  0 0 1 0 1 1 1 1 | 0 0 0 |
| $D_1=D_2=210$ns  1.5 MHz | 330ns (346-314) | 35  31 | 0 0 1 0 0 0 1 1  0 0 0 1 1 1 1 1 | 0 0 1 |
| $D_1=D_2=150$ns  2.0 MHz | 250ns (262-238) | 26  24 | 0 0 0 1 1 0 1 0  0 0 0 1 0 1 1 1 | 0 1 0 |
| $D_1=D_2=120$ns  2.5 MHz | 200ns (210-190) | 21  19 | 0 0 0 1 0 1 0 1  0 0 0 1 0 0 1 1 | 0 1 1 |
| $D_1=D_2=105$ns  3.0 MHz | 166ns (174-158) | 17  16 | 0 0 0 1 0 0 0 1  0 0 0 1 0 0 0 0 | 1 0 0 |
| $D_1=D_2=90$ns  3.5 MHz | 139ns (146-132) | 15  13 | 0 0 0 0 1 1 1 1  0 0 0 0 1 1 1 0 | 1 0 1 |
| $D_1=D_2=60$ns  4.0 MHz | 125ns (119-131) | 13  12 | 0 0 0 0 1 1 0 1  0 0 0 0 1 1 0 0 | 1 1 0 |
| $D_1=D_2=45$ns  4.5 MHz | 111ns (117-105) | 12  10 | 0 0 0 0 1 0 1 1  0 0 0 0 1 0 1 0 | 1 1 1 |

*Fig. 7*

DATA RATE ADAPTIVE CONTROL DEVICE FOR MANCHESTER CODE DECODERS

BACKGROUND OF THE INVENTION

In transmitting serial digital data, it is necessary to provide a series of clock pulses in addition to the data in order to synchronize the coding of the transmitted serial data at the receiving terminal. In prior known transmitting schemes two channels were required for this purpose; one for date, and one for clock. In attempting to avoid the requirement for two such channels, and to eliminate certain difficulties in magnetic recording of serial digital data, self-clocking codes evolved as a result of combining clock and data signals. The Manchester code is one such self-clocking code. Manchester encoders accept clock and data and combine them into a single output which may then be transmitted via a single channel to the receiving terminal. When the self-clocking data arrives at the receiving terminal it is processed by the decoder which extracts separately both data and clock from the input self-clocking code.

The properties of Manchester code are well known in the art of digital communications and magnetic recording of digital data. Only the parameters related to an understanding of the present invention will be described. The Manchester code consists of a sequence of pulses whose widths can have either of two possible values, W or 2W, depending on the one, zero sequence of the data stream. The absolute values of W and 2W are dependent upon the rate of the data stream. For example, if the data rate is 2 MHz, W=250 ns and 2W=500 ns.

Figure 1:
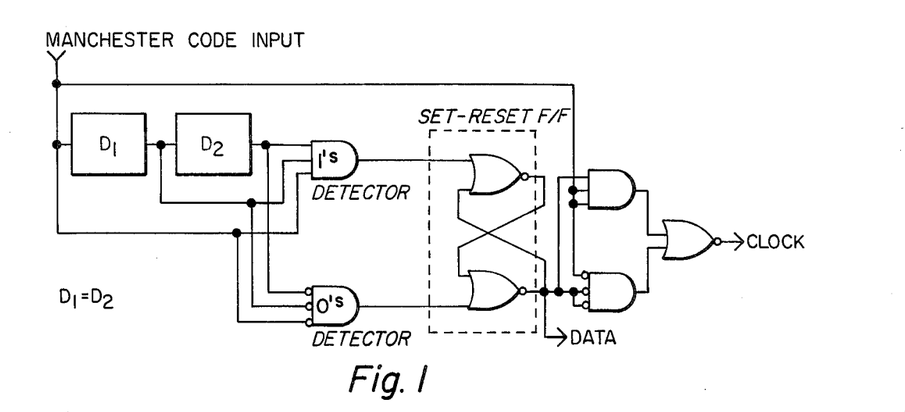
FIG. 1 shows a typical state of the art Manchester code decoder.

FIG. 1 shows a typical Manchester code decoder where $D_1$ and $D_2$ are equal fixed delays that are selected for a particular input data rate. The required delay value is one-third of the input data bit period. As a result of the signal passing through $D_1$ and $D_2$ three signals are created. These three signals are (1) the undelayed input signal to $D_1$, (2) the signal delayed by $D_1$ or one-third of a bit period, and (3) the signal delayed by $D_1+D_2$ or two-thirds of a bit period. These three signals are then fed into the gates that follow the delays. The upper gate, an "AND" gate, is the "1"s detector. It decodes a "1" during any interval of "high" coincidence of these three input signals. The lower gate, a "NOR" gate, is the "0"s detector. It decodes a "0" when its three inputs are coincidentally "low." The outputs of the 1's and 0's detectors are fed into a set-reset flip-flop composed of two input "NOR" gates. The output of this flip-flop provides the decoded Manchester data. Further logic combination of Manchester code and data provide the clock output.

Since delays $D_1$ and $D_2$ are fixed, the decoder is optimized for a single input data rate. Such a decoder cannot be used for input data rates which lie outside of this single frequency. In applications where a variety of data rates is expected, a separate decoder is required for each individual data rate.

SUMMARY OF THE INVENTION

The present invention provides a means by which a single decoder can automatically adapt to a wide range of input data rates. The data rate is sensed by means of a pulse width to digital converter which provides a digital control word which is the digital equivalent of a single pulse of the input preamble. The digital equivalent of the pulse width is fed to a read only memory (ROM) look-up table which will provide a digital output that will gate the appropriate amount of delay for the Manchester code decoder so that the delay is optimized for the incoming data stream. When the pulse width to digital conversion has been completed, the result of this conversion is stored in the delay control register until the entire transmission at that data rate has been completed. After the completion of the transmission and a predetermined time delay with the additional transmission at the same data rate, the pulse width to digital converter and delay control register are automatically cleared and await the receipt of another preamble message at any of a variety of possible data rates within the data range of the control delays of the Manchester code decoder. This process is repeated as each new preamble is received indicating the data rate of the new incoming data stream.

Accordingly, an object of the invention is the provision of a data rate adaptive control device for Manchester code decoders which automatically adapts to a wide range of input data rates.

Another object of the invention is the provision of a data rate adaptive control device for Manchester code decoders which does not require any analog synchronizing schemes and relies simply on a digital control word that results from the detection of the data rate.

Another object of the invention is the provision of an optimized delay control for a Manchester code decoder wherein the control is completely digital and results from a stored digital word which is the equivalent of the incoming data rate.

Another object of the invention is the provision of a delay control means for a Manchester code decoder which will operate over a wide range of data rates, limited only by the speed of devices available for implementing the circuitry.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 2:
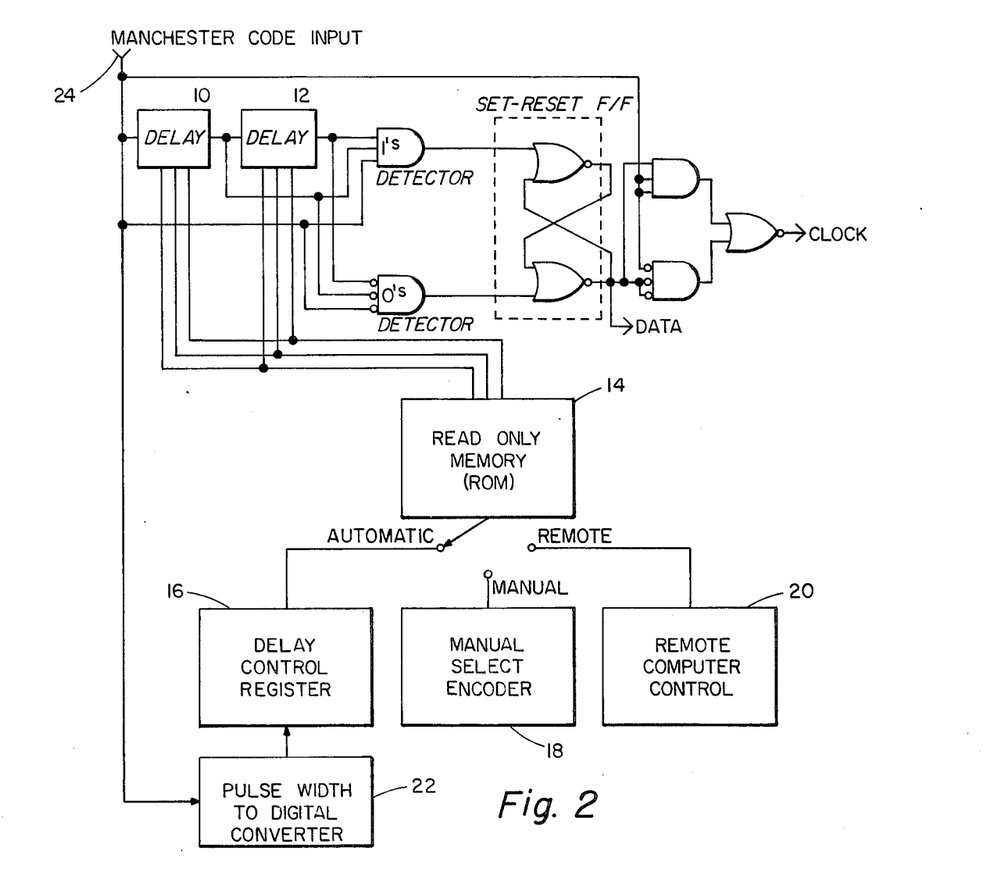
FIG. 2 shows in block diagram form the present invention applied to a Manchester code decoder.

Referring now to FIG. 2 where there is shown the decoder of FIG. 1 modified in accordance with the present invention. Instead of the fixed delays $D_1$ and $D_2$ delay circuits 10 and 12 are shown as tapped delay lines and are controlled by the output from read-only memory circuit 14. Read-only memory 14 may be controlled automatically from the output from delay control register 16 or controlled manually by the manual output from the manual select encoder 18 or may be controlled from a remote computer control 20.

In the automatic mode the digital control of the tapped delays 10 and 12 is accomplished by an output generated by the pulse width to digital converter 22 and the delay control register 16. The incoming data at input terminal 24 is sampled by the pulse width to digital converter 22. Whenever data is to be transmitted, the transmitting station sends a preamble message which is a sequence of "ones" for a predetermined period of time. This preamble message provides the pulse width to digital converter 22 with a series of pulses, whose widths are equal and known for a particular data rate. Upon receipt of this preamble message, the pulse width to digital converter 22 gates out a single pulse, converts it to its digital equivalent and stores this result in the delay control register 16.

Figure 7:
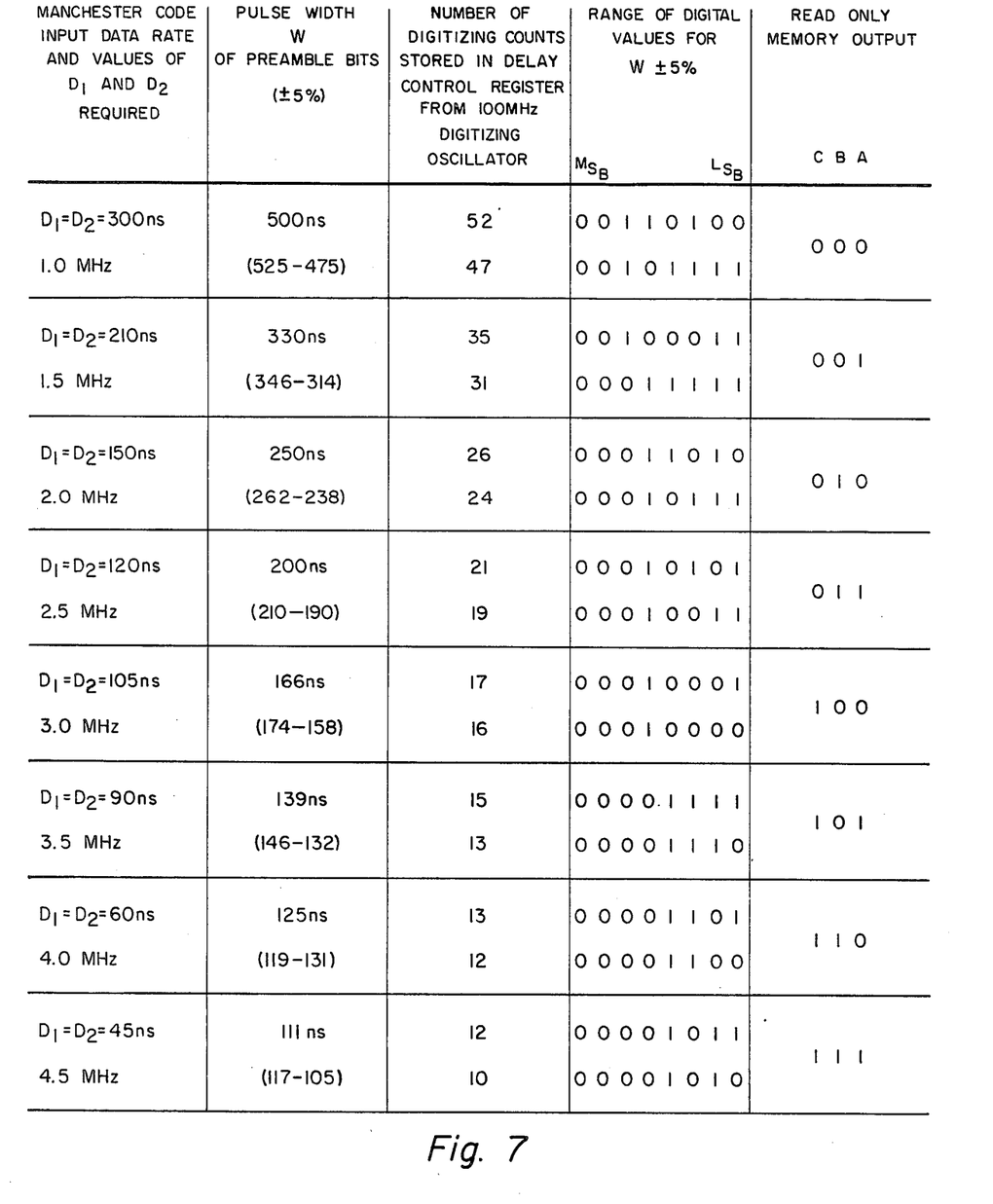
FIG. 7 is a look-up table for the ROM of FIGS. 2 and 4.

The digital information stored in the delay control register 16 is fed to read-only memory 14. Read-only memory 14 has been programmed with a look-up table (FIG. 7) which is read to provide an output which will gate the appropriate taps on delay circuits 10 and 12 to optimize the amount of delay for the particular data rate of the incoming data stream. When the pulse width to digital conversion has been completed, the results of this conversion is stored in delay control register 16 until the entire transmission has been completed. After the completion of a transmission the converter waits a predetermined time for additional transmission at the same data rate. If after this predetermined time no additional data is received the pulse width to digital converter 22 and delay control register 16 are automatically cleared and await the receipt of another preamble message at any of a variety of possible data rates within the range of the controlled delayed circuits 10 and 12. This process is repeated as each new preamble is received indicating the data rate of the new incoming data stream.

Figure 3:
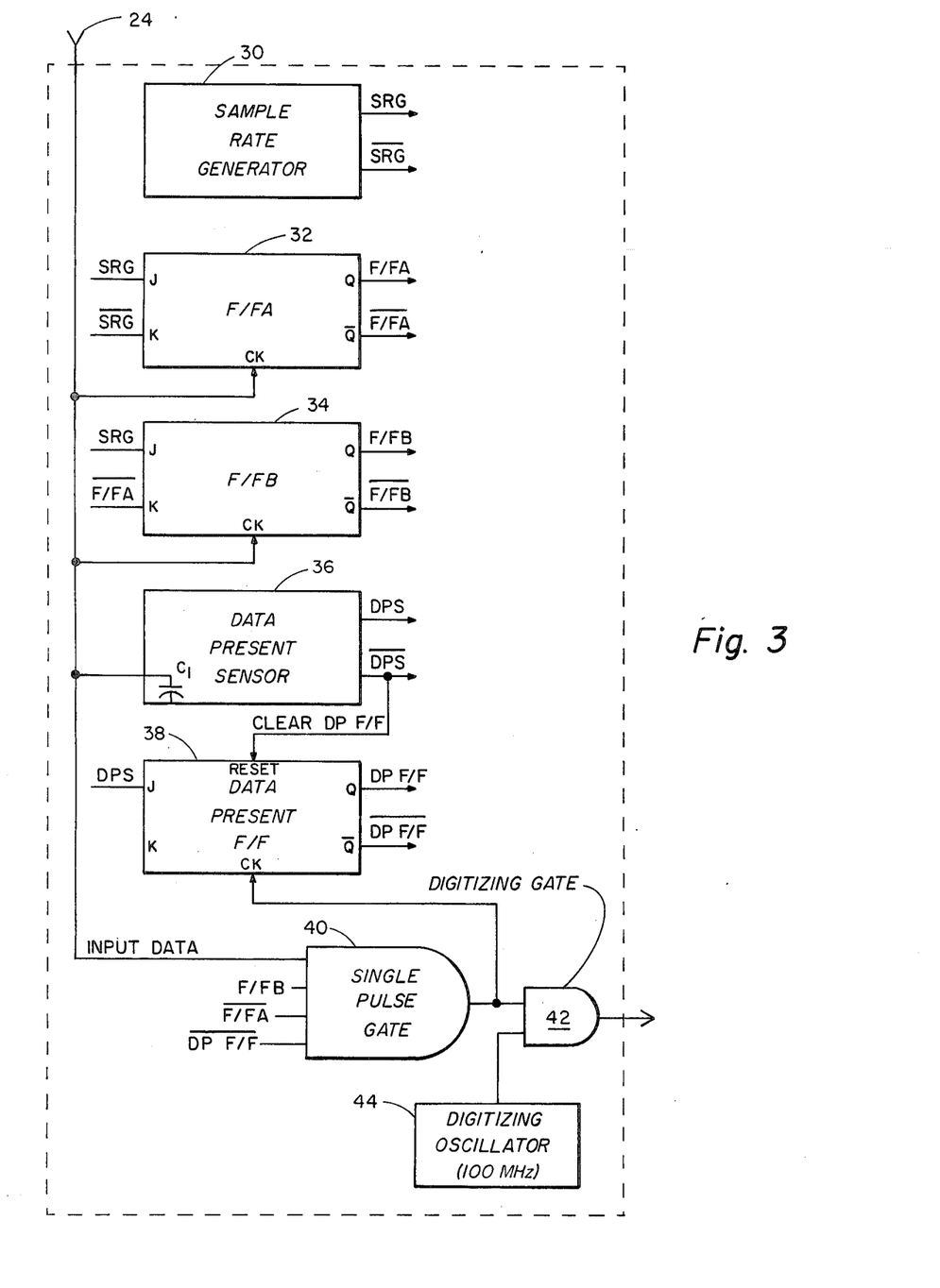
FIG. 3 shows the pulse width to digital control circuit of FIG. 2.
Figure 4:
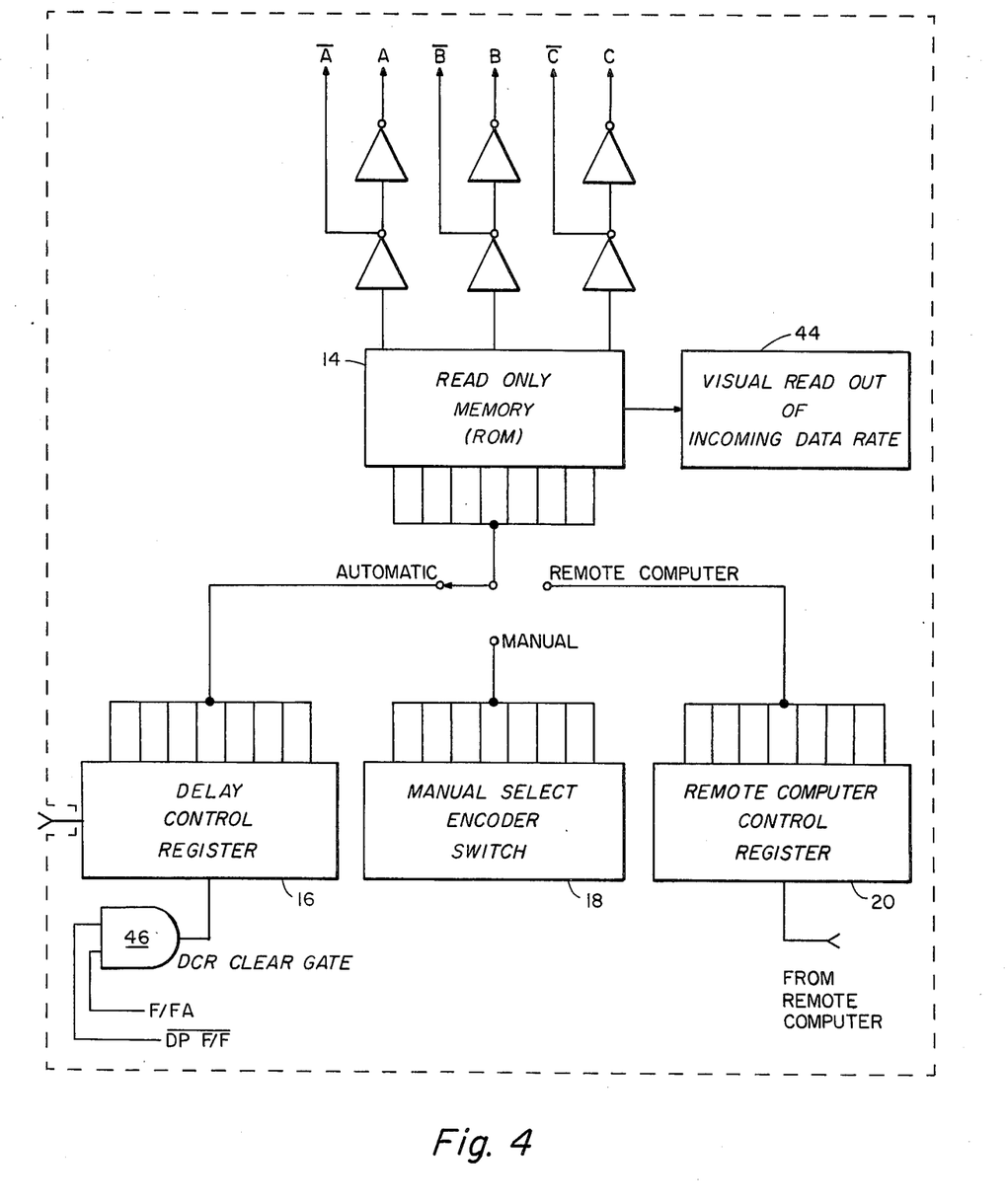
FIG. 4 shows in detail the manner in which the delay control signal of FIG. 2 is generated.
Figure 5:
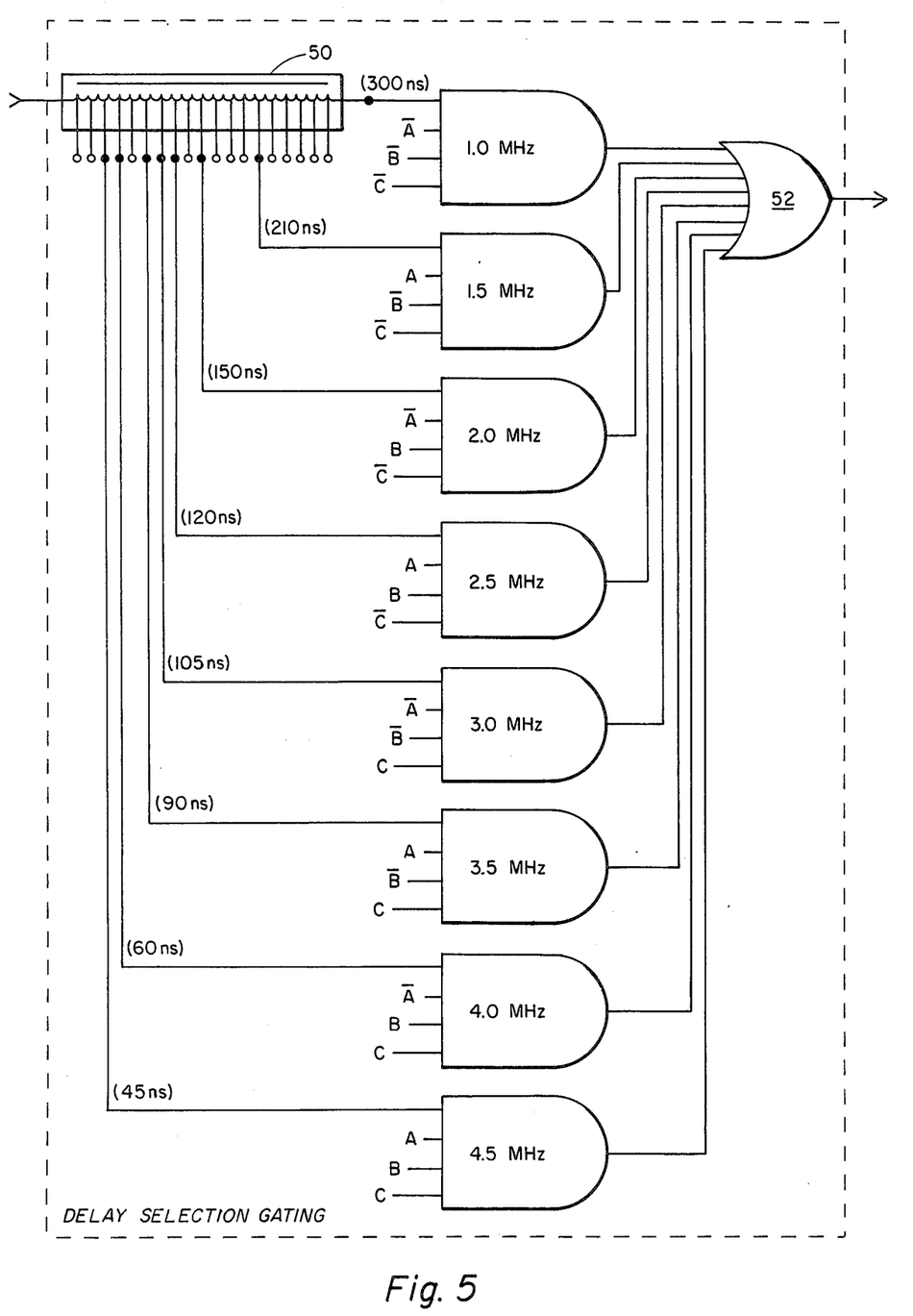
FIG. 5 shows the delay and delay control gates in selecting the amount of delay for use in the embodiment of FIG. 2.
Figure 6:
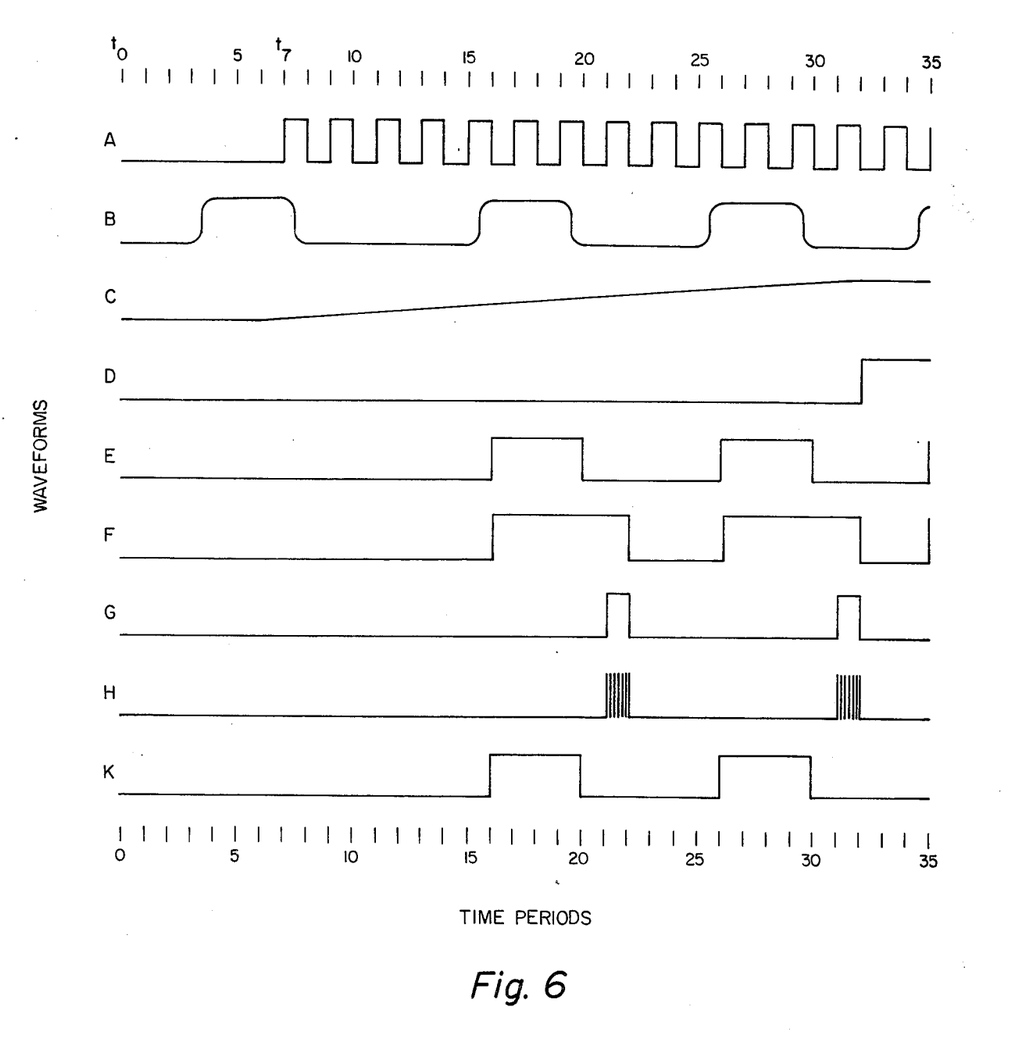
FIG. 6 illustrates a schematic timing diagram for the logic operation of a preferred embodiment of the invention.

FIGS. 3 through 7 show an implementation of the control device to cover the range of data rates from 1 MHz to 4.5 MHz. Referring now to FIG. 3 wherein there is shown a sample rate generator which provides a sampling rate compatible with the data range of the decoder to be controlled, and the width of the sampling gate is greater than the widest preamble pulse within the input data rate range. Sample rate generator 30 is free running and asynchronous with respect to the incoming data stream (waveform A, FIG. 6). The output from sample rate generator (SRG) (waveform B, FIG. 6) is connected to the J inputs of flip-flops 32 and 34. Each of flip-flops 32 and 34 are clocked by the incoming data stream from terminal 24. The incoming data stream is also fed to a data present sensor 36 and as an input to AND gate 38. The data present sensor 36 consists of a capacitor and shaping circuit which detects the presence of incoming data. As shown in FIG. 6 (waveform C) it takes about 32 pulse widths to charge the capacitor to a steady state value. This steady state value will remain until the completion of the transmission. The output from data present sensor 36 is fed to the J input of data present flip-flop circuit 38. The complement of the data present sensor output is fed to the reset terminal of data present flip-flop 38. The purpose of data present flip-flop 38 is to provide a logical signal which is true during the time the decoder is in use. The outputs from flip-flops 32 and 34 are anded together with the incoming data stream and a signal from the data present flip-flop 38 in AND gate 40 which allows a single pulse of the incoming data stream to be gated out during each cycle of the sample rate generator 30. The output pulse from single pulse gate 40 has two functions: it supplies a clock source for the data present flip-flop 38 and it supplies a single pulse of the incoming data stream 2 to the digitizing gate 42. A source of digitizing pulses is provided by digitizing oscillator 44 which should be a stable crystal controlled oscillator of high frequency (100 MHz). When an output pulse from gate 40 appears at the input to digitizing gate 42 digitizing pulses will be passed and stored in the delay control register 16 (FIG. 4).

As shown in FIG. 4 read only memory 14 may be controlled from three different inputs. In the automatic mode control is from delay control register 16, in the manual mode control is from an encoder switch 18 and in the remote computer mode control is from control register 20. Also a visual readout 44 may be provided to read out visually the incoming data rate. The output from ROM 14 provides the necessary gating signals $\overline{A}$, A, $\overline{B}$, B, $\overline{C}$ and C for the delay circuits 10 and 12.

FIG. 5 is a detailed diagram of a typical delay line for use in FIG. 2. As shown delay line 50 is a 300 nanosecond total delay with 20 taps of 15 nanoseconds each. Connections have been made to the taps as shown to provide a range of delays from 45 nanoseconds to 300 nanoseconds. Each specific delay which is the optimized delay for a particular incoming data rate is associated with an AND gate. The delayed signal will be gated to the remainder of the decoder in response to the output from ROM 14. For example, the tap providing a 45 nanosecond delay is coupled as an input to the 4.5 MHz gate. Each of the gates are controlled by the digital outputs from read-only-memory 14. All of the outputs from the gates are connected to an OR gate 52 which feeds the delayed signal to the rest of the decoder circuitry.

With the aid of the timing diagram of FIG. 6 a complete cycle of operation of the control device will be described. In the absence of any incoming data there is no action except for the free-running output of sample rate generator 30 (waveform B). This is the condition that exists between $t_0$ and $t_7$. Referring to FIG. 3 it will be noted that the output from sample rate generator 30 is connected to the J input for both flip-flops 32 and 34. The logic equations for these two flip-flops are

| F/F32 | $J_A = SRG$ |
|---|---|
|  | $K_A = \overline{SRG}$ |
| F/F34 | $J_B = SRG$ |
|  | $K_B = \overline{F/TA}$ |

It will also be noted from FIG. 3 that the clock source for flip-flop 32 and flip-flop 34 is the incoming data from terminal 24. Flip-flop 32 and flip-flop 34 are negative edge triggered and are shown as waveforms E and F, respectively. There is no data (waveform A) between $t_0$ and $t_7$, therefore during this interval of time flip-flop 32 and flip-flop 34 cannot change state. At $t_7$ (waveform A) data appears at the input to terminal 24 and capacitor $C_1$ of data presence sensor 36 begins to charge to the level of the incoming data. The value of capacitor $C_1$ should be selected so that it requires several cycles of the output signal from sample rate generator 30 before it is fully charged. As shown in the timing diagram (waveform C) $C_1$ may be considered to be fully charged at $t_{31}$. Following the timing sequence, between time $t_{15}$ and $t_{16}$ the output of sample rate generator 30 (waveform B) goes high and remains high until between $t_{19}$ and $t_{20}$. Both flip-flops 32 and 34 are set high by the negative going edge of signal A at $t_{16}$. When waveform B goes low flip-flop 32 is then reset to the low state by the negative edge of waveform A at $t_{20}$. Flip-flop 34 is reset to the low state by the negative edge of waveform A at $t_{22}$. Logic equation for the single pulse gate 40 of FIG. 3 is, SPG = (Data) (F/FB) $\overline{\text{(F/FA)}}$ $\overline{\text{(DPF/1)}}$ Single pulse gate 40 is a four input positive AND gate and its equation defines the conditions for which it will be high. It can be seen by referring to FIGS. 3 and 6 that all input conditions are satisfied between $t_{21}$ and $t_{22}$ and therefore the output of gate 40 is true (waveform G) for one pulse width of incoming data. The output of single pulse gate 40 is one input to digitizing gate 42. Digitizing gate 42 is a two-input positive AND gate and its logic equation is,

DG = (DO) (SPG)

As previously explained digitizing oscillator 44 should be a stable crystal control oscillator of high frequency with respect to the incoming signal rate. The output of oscillator 44 as the second input of gate 42. As shown in the timing diagram of FIG. 6 both inputs to gate 42 are satisfied between $t_{21}$ and $t_{22}$. Allowing every pulse from the digitizing oscillator between $t_{21}$ and $t_{22}$ to pass through and be counted and stored in delay control register 16 (FIG. 4). The data stored in register 16 is the digital equivalent of the input data rate received at input terminal 24. It is this data word that addresses the read-only-memory 14 look-up table. The appropriate gates of FIG. 5 are then enabled so that the amount of delays for delays 10 and 12 (FIG. 2) are optimized for the incoming data stream.

As shown in FIG. 6, at time $t_{22}$ the negative edge of waveform G is available to clock data present flip-flop 38 as previously explained, but at $t_{22}$, capacitor $C_1$ (waveform C) is not yet fully charged. Because there is no high signal at the J input to data present flip-flop 38 at $t_{22}$ it remains low. Between $t_{25}$ and $t_{26}$ waveform G again goes high. The negative edge of the incoming data stream (waveform A) at $t_{26}$ clocks both flip-flops 32 and 34 both go high at $t_{26}$ as their J input equations are satisfied at $t_{26}$. Between $t_{26}$ and $t_{30}$, DCR clear gate 46 is high (FIG. 4). The DCR clear gate is a two input positive AND gate and its logic equation is, DCR Clear GATE = (F/FA) $\overline{\text{(DPF/F)}}$ The purpose of DCR clear gate 46 is to clear the delay control register before each pulse width to digital conversion. The clear gate signal for delay control register 16 can only occur during the time before data present flip-flop 38 is set high. Between $t_{26}$ and $t_{30}$ delay control register 16 (FIG. 4) is cleared so that it is ready to receive the new data that it receives from digitizing gate 42 (FIG. 3). As shown in FIGS. 3 and 6 between $t_{31}$ and $t_{32}$ the negative edge of waveform G sets data present flip-flop 38 to the high state since the J input to data present flip-flop 38 goes high at $t_{31}$. This is the result of capacitor $C_1$ being fully charged. As a consequence of data present flip-flop 38 being set to the high state at $t_{32}$, the most recent pulse width to digital conversion result which took place between $t_{31}$ and $t_{32}$ is stored in delay control register 16 (FIG. 4) until the ensuing transmission is completed. After the completion of this transmission, and a predetermined time for additional transmission at the same data rate, if no additional data is received, capacitor $C_1$ will discharge causing an output pulse from data present flip-flop 38. This signal is fed to and will cause DCR clear gate 46 to clear and await the receipt of another preamble message at any of a variety of possible data rates within the range of the control delays.

In the embodiment disclosed in order to cover the range of data rates from 1 MHz to 4.5 MHz, delays 10 and 12 must each be 300 nanoseconds. The devices for this implementation may be Part No. 2214-300B manufactured by Data Delay Devices. This delay is a total of 300 nanoseconds with 20 taps. Each tap is equal to 15 nanoseconds of delay. Two of these delays are used, one for delay 10 and one for delay 12. The frequency of digitizing oscillator 44 is 100 MHz which provides 10 nanoseconds digitizing pulses to provide sufficient resolution for the pulse width to digital conversion. The table of FIG. 7 lists variables of interest for the 1 MHz to 4.5 MHz data range. These variables are (1) Manchester code input data rate, and required value of D1 and D2; (2) the pulse width of preamble pulses W and ±5% possible variation of W; (3) the number of digitizing counts that will be stored in the delay control register 16 as a result of a pulse width to digital conversion of the preamble pulse width W at the 100 MHz digitizing frequency from the digitizing oscillator 44 that will be stored in the delay control register 16 as a result of the pulse width to digital conversion of the preamble pulse width W at the 100 MHz digitizing frequency of the digitizing oscillator 44; (4) the range of digital values for W ±5%; and (5) the ROM 16 output code to control the delay selection gates of FIG. 5 for each input data rate.

Obviously many modifications and variations of the present invention are possible in the light of the above teachings. It is therefore to be understood that within the scope of the appended claims the invention may be practiced otherwise than as specifically described.

I claim:

1. A data rate adaptive control device for Manchester code decoder comprising:
   input means for receiving Manchester encoded data, said encoded data having a preamble which is a series of pulses, whose widths are equal and known for a particular data rate;
   pulse width to digital converter means connected to said input means for providing an output signal indicative of the data rate in response to the detected pulse widths of said preamble, said pulse width to digital converter means including;
   first and second flip-flop circuits, each of said flip-flop circuits having a j input, a k input, a clock input, a q output, and a $\bar{q}$ output;
   a sample rate generator having first and second outputs, the first output of said sample rate generator being connected to the j input of said first and second flip-flop circuit, the second output of said sample rate generator being connected to the k input of said first flip-flop circuit;

the clock inputs of said first and second flip-flop circuits being connected to said input means for receiving said Manchester encoded data;

data present sensor circuit means having an input connected to said input means for receiving said Manchester encoded data and first and second outputs;

a data present flip-flop circuit means having a j input connected to the first output of said data present sensor circuit means, a reset input connected to the second output of said data present sensor circuit means, a clock input, a q output, and a $\bar{q}$ output;

an AND gate having a first input connected to said input means for receiving said Manchester encoded data, a second input connected to the q output of said second flip-flop circuit, a third input connected to the $\bar{q}$ output of said first flip-flop circuit, and a fourth input connected to the $\bar{q}$ output of said data present flip-flop circuit means, for providing a single pulse of the incoming data stream to be gated out during each cycle of said sample rate generator;

circuit means connected to said input means and to said pulse width to digital converter means for controlling the amount of delay of the received encoded data to provide optimum decoding of the encoded data.

2. The control device of claim 1 wherein a read-only memory is coupled to the output of said pulse width to digital converter for generating an output digital word in response to the sensed pulse width.

3. The control device of claim 2 wherein said circuit means includes a tapped delay line connected to said input means and to said read-only memory for providing a range of delays, one of which will be selected by the digital output from said read-only memory.

4. The control device of claim 3 wherein said circuit means further includes a plurality of logic gates connected to said delay line and to said read-only memory for gating the data signal received at said input means through a portion of said delay line corresponding to the desired delay represented by the digital output word from said read-only memory.

* * * * *